United States Patent [19]

Schuster et al.

[11] 4,123,285

[45] Oct. 31, 1978

[54] FOAMED CERAMIC ELEMENT

[75] Inventors: Peter Schuster, Mannheim, Neu-Edingen; Bernd von Chairi, Rodental, both of Germany

[73] Assignee: Schneider GmbH & Co., Frenchen, Germany

[21] Appl. No.: 765,304

[22] Filed: Feb. 3, 1977

[30] Foreign Application Priority Data

Feb. 7, 1976 [DE] Fed. Rep. of Germany ....... 2604793

[51] Int. Cl.$^2$ ............................................. C04B 21/02
[52] U.S. Cl. ..................................... 106/40 R; 106/71
[58] Field of Search ............................... 106/40 R, 71

[56] References Cited

U.S. PATENT DOCUMENTS

| 3,030,215 | 4/1962 | Veatch et al. | 106/40 R |
| 3,598,618 | 8/1971 | Fujii et al. | 106/40 R |
| 3,801,343 | 4/1974 | Lemmens | 106/40 R |
| 4,004,933 | 1/1977 | Ravault | 106/40 R |

Primary Examiner—L. Dewayne Rutledge
Assistant Examiner—John P. Sheehan
Attorney, Agent, or Firm—Wigman & Cohen

[57] ABSTRACT

A foamed ceramic product and method for making same is disclosed. The foamed ceramic is characterized by a high compressive strength, high insulating properties and low fluid permeability when compared against conventional materials.

The foamed ceramic is made by mixing a clay mineral with a foaming agent comprising a combination of sulfate and sulfide compounds, heating to a temperature of about 1,000° C where controlled foaming occurs and then cooling the resulting foamed product.

11 Claims, 1 Drawing Figure

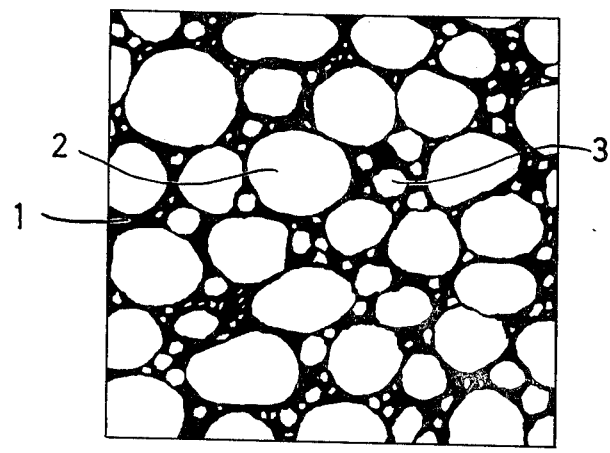

FOAMED CERAMIC ELEMENT

BACKGROUND OF THE INVENTION

The invention relates generally to a ceramic light construction element and for a process for making same.

Ceramics of lightweight construction materials are known. Typically such materials can be produced by placing granulated material of approximately uniform size into a molding box where the granulated material is swelled. Thereafter highly heated gas is blown through the mass until a ceramically binding condition of the surfaces of the granulated parts is reached, after the swelling has taken place. In such a process, the granulated parts are, as a rule, inflexibly supported to permit expansion into the free spaces where the particles are united to form a body of ceramically bound granulated parts.

However, in the known lightweight construction materials, the final product comprises a grainy structure, i.e., a structure where visible phase interfaces remain. Furthermore, the pore structure in the finished product is not homogeneous with respect to the size and distribution of the pores so that the lightweight construction material does not have isotropic properties, particularly with regard to thermal conductivity and rigidity. In addition, the known construction materials have a high water adsorptive capacity and the processes for making same are technologically complicated and expensive.

It has been suggested to swell suitable massive bodies, e.g., briquettes and continuous long pieces of clay-containing material, in a furnace. In this case, the swelled material separates from the unswelled material, falls onto the bottom of the furnace and is withdrawn from there. A homogeneous isotropic construction material with a low water absorptive capacity cannot be produced in this manner either.

In addition to the clay-mineral products, construction and insulating materials made of foamed glasses are known. In contrast to conventional clay-mineral insulation materials, foamed glass does not absorb water and has a diffusion resistance factor which is practically infinite. Such foamed glass products are made by mixing ground glass with a foaming agent and filling the admixture into steel molds. Foaming is induced in a tunnel kiln or compartment kiln and the foamed product is then cooled. As a rule, carbon or an organic compound decomposable to carbon at a temperature below the cell formation temperature are utilized as foaming agents. The foamed glass is practically free from crystals. However, an essential disadvantage of foamed glass lies in its low strength and its low compatibility with mortar. Additionally, when porous structure is damaged there is evolved undesirable odors previously trapped in the closed pores.

Accordingly, there still remains a need for a lightweight ceramic material which does not have the aforementioned disadvantages of the known materials.

SUMMARY OF THE INVENTION

It is the primary object of this invention to provide a lightweight construction element which has the desirable insulating and lightweight features of the clay-mineral and foamed glass but without its disadvantages. The object of this invention is carried out by providing a foamed ceramic element produced from mineral raw materials, preferably a clay-mineral having a crystal phase portion of more than about 10% by weight, preferably 15–30% by weight, a water absorption of practically zero and a diffusion resistance factor which is practically infinite.

The foamed ceramic body according to the present invention is characterized by the fact that it has relatively large spherical pores of almost the same size which are homogeneously distributed. Solid material surrounds the pores in a web-like manner and depending on the kind of the raw material used, contains about 10% by weight or more of a crystalline component (for example, anorthite), the remaining components of the solid material phase being X-ray amorphous. What is surprising is the fact that the webs of solid material are also porous and such pores have an average diameter which is much different than the relatively large pores surrounded by the webs. An analysis of the pore distribution is the foamed ceramic element according to the present invention yields two maxima which differ distinctly from each other and which result from the fact that the large pores are always surrounded by small pores, i.e., the webs between the large pores are filled with small pores. It has been observed that the ratio of the average diameter of the large pores (1st maximum) to the average diameter of the small pores (2nd maximum) ranges from about 3:1 to about 8:1. A preferred ratio is from about 4:1 to about 5:1. The gross density of the foamed ceramic element is generally between about 200 to about 1,000 kg/m$^3$ and preferably between about 400 to about 600 kg/m$^3$. The compressive strength of the foamed element in these gross density ranges is from about 4.0 to about 8.0 (or from about 2.5 to about 12 N/mm$^2$, respectively).

It is particularly advantageous that the relatively large pores in the foamed ceramic element are uniformly distributed and the deviation from the average pore diameter should not be more than ±50%. An especially suitable foamed ceramic element has relatively large pores with a diameter in the range of from about 1.5 to 2.5 mm in homogeneous distribution whereby gross densities between about 300 and 600 kg/m$^3$ are achieved. The foamed ceramic element according to the invention is to a large degree compatible with mortar and has a considerably higher fire resistance in comparison with conventional foamed glass. Furthermore, a shaped body of foamed ceramic according to this invention has a low thermal conductivity of between about 0.08 and 0.2 kcal/m °C. and thus a high thermal insulation value. It is resistant to humidity, fouling, and the effects of rodents and pests.

The process for the production of the foamed ceramic elements according to the present invention is characterized by the steps of (a) admixing a sulfate, a sulfide and water with the clay-mineral starting material which ordinarily cannot be swelled, (b) then heating the clay-mineral admixture until foaming occurs, (c) subsequently cooling the foamed product. It was very surprising that, when clay-mineral is combined with a sulfate and a sulfide, the foaming process of the ordinarily non-swelling clay-mineral material can be controlled to such an extent that an isotropic ceramic foam body can be produced.

From the production of expanded clay, it is actually known that material which cannot ordinarily be swelled can be swelled by adding a swelling adjuvant or agent and fluxing agents However, it is first necessary to provide relatively small granules, in comparison with a construction element, with a densely sintered outer skin, and, subsequently, to generate the gas from the swelling adjuvant so that the granules or grains can be swelled. As swelling adjuvants, gypsum or lignin sulfate are known. However, with these compounds and the known swelling adjuvants, gas evolution proceeds so fast after a certain temperature is reached that the foaming of large-format elements cannot be performed with the known swelling adjuvants.

It was unexpectedly discovered that when a mixture of sulfate and sulfide is used, gas evolution does not occur suddenly but rather gradually so that a temperature-dependent, adjustable and controllable foaming of clay-mineral-containing raw materials, which cannot ordinarily be swelled, becomes possible.

The swelling adjuvant according to the invention contains a mixture of a suitable sulfate and a sulfide at a ratio of about 10:1 to about 1:1, preferably about 3:1. The mixture is added to the foamable clay-mineral-containing raw material preferably in amounts of about 0.2 to 10%, by weight and preferably about 2 to 5% by weight, in relation to the solid phase.

A variety of suitable sulfate and sulfide compounds can be employed. A combination of iron sulfide and iron sulfate is particularly suitable but barium or calcium compounds can also be utilized. It is also possible to use sulfate and sulfide compounds with different cations in combination. Furthermore, compounds can be utilized which are partially or entirely soluble in water. It is essential that the sulfate can get into contact with the sulfide during the foaming process which can, for example, be achieved by an intimate mixing of the clay-mineral-containing raw materials with the foaming adjuvant.

The foaming adjuvants should not be pure compounds but rather a mixture of other products compatible with the clay-mineral-containing raw materials to be foamed. For example, sulfate or sulfide-containing products, particularly industrial or natural waste products, are usable. These can include slags, waste from the chemical industry, communal waste products, ash from combustion systems, dusts, filter ash or residues from processing. If only one of the sulfur compounds is contained in these products, it is supplemented by a product containing the other sulfur compound and/or by a pure other sulfur compound.

It is of special advantage when the sulfate and sulfide is attached to each other in the primary grain or particles of the foaming adjuvant are desirably below 200 $\mu$m and preferably below 60 $\mu$m.

In mixing the clay-mineral-containing raw materials with the foaming adjuvant it is also advantageous if, in addition to sulfate and sulfide, $SiO_2$, $Al_2O_3$, iron oxide and alkali oxide are also present. This particularly advantageous combination of the compounds is, as a rule, present in filtered sludge products, particularly in filtered sludge ash, so that such waste products are especially suitable for use as foaming adjuvant.

According to the process of the present invention, foaming is preferably effected in an oxidizing atmosphere at a temperature between about 1,000° and 1,200° C. and for a time of between 10 and 180 minutes. It is possible to use raw materials with large foaming temperature intervals and to control the foaming process which is dependent on temperature and time, in such a manner that foamed ceramic elements are produced with predetermined properties with regard to strength, porosity and thermal conductivity. This can be accomplished by, e.g., varying the sulfate/sulfide ratio and the quantity of foaming adjuvant. Clays, particularly stone clays, preferably with an illite portion, and loams are suitable clay-mineral starting materials. Fluxing agents can be added from the known alkali compounds. Such compounds can also be included with the foaming adjuvant.

Construction ceramic elements of any shape and size can be produced with the process according to the present invention to yield a higher strength in comparison with known products having the same porosity. At the same time, the ceramic element of the present invention has a lower thermal conductivity. This synergistic effect is probably due to the extraordinarily favorable influence on the structure of the foamed ceramic elements by the foaming adjuvant, i.e., the formation of two maxima of pore distribution. It is also possible to use this foaming adjuvant as a swelling adjuvant for the production of expanded granulated clay parts.

BRIEF DESCRIPTION OF THE DRAWINGS

FIG. 1 illustrates the structure of the foamed ceramic element made in accordance with the present invention (e.g., see Example 2, infra). More particularly, the pore distribution of the element consists of the web material 1, the relatively large pores 2 and the relatively small pores 3. The ratio of the average pore diameter of the large pores to the average pore diameter of the small pores in the web material is, in this instance, about 4.5 to 1.

DESCRIPTION OF PREFERRED
EMBODIMENTS

Having described the invention in general terms, the following examples are set forth to more particularly illustrate the invention. These examples, however, are not meant to be limiting. All percentages are by weight.

EXAMPLE 1

A mixture of 70% stone clay, 20% ground basalt, 3% iron sulfide and 7% iron sulfate was prepared. Two parts by weight of water were added to one part by weight of the preparation and the mixture was intimately mixed in the ball mill for 4 hours. Subsequently, the mixture was poured into cups. This was followed by drying to a residual water content of below 2% water. The dried substance was then crushed and put into a mold 20 × 20 × 15 cm, 8 cm high and place in a furnace and heated to 1,160° C. at 2° C./minute. The substance foamed uniformly in the temperature range of 1,140 to 1,170° C. After cooling, a foamed ceramic plate was obtained having a density of 500 kg/m$^3$, a compressive strength of 8 N/mm$^2$ and a thermal conductivity of 0.1 kcal/m h ° C. The average pore diameter of the relatively large pores amounted to 2 mm.

EXAMPLE 2

The preparation consisted of 50% stone clay and 50% of a filtered sludge ash product of a composition similar to a clay substance. This preparation contained 0.9% $S^{-2}$ and 2.6% $SO_4^{-2}$. The processing and the foaming were effected according to Example 1. This resulted in a foamed ceramic plate having a density of 400 kg/m$^3$, a bending strength of 3 N/mm$^2$ and compressive strength of 7 N/mm$^2$. The gas permeability of the plate amounted to 10 nanoperms and its thermal conductivity was 0.1 kcal/m h ° C. The average pore diameter of the relatively large pores amounted to 2 mm.

EXAMPLE 3

In accordance with Example 1, a mixture was made comprising 50% loam, 10% ground basalt and 40% of a filtered sludge ash product with the composition according to Example 2. The mixture was heated to 1,150° C. and the resulting foamed product then cooled. A foamed ceramic plate was obtained with a density of 400 kg/m$^3$ and with the same properties as indicated in Example 2 with regard to bending strength, compressive strength, gas permeability, thermal conductivity, as well as pore distribution.

It should be appreciated that the present invention is not to be construed as being limited by the illustrative embodiments. It is possible to produce still other embodiments without departing from the inventive concept herein disclosed. Such embodiments are within the ability of one skilled in the art.

What is claimed:

1. Foamed ceramic element of lightweight and of uniform construction throughout formed from mineral raw materials comprising a body portion with relatively large, spherical-like closed pores substantially uniformly distributed throughout said portion, a solid portion of web-like construction surrounding said relatively large, spherical-like pores, said solid portion of web-like construction including relatively small pores distributed throughout said solid portion, the ratio of the mean diameter of the larger pores to the mean diameter of the smaller pores ranging from 3:1 to 8:1, said ceramic element having a crystalline phase of at least about 10 percent by weight and further characterized as having a water absorption characteristic nearly zero and a diffusion resistance factor which is practically infinite.

2. The foamed ceramic element according to claim 1, wherein said substantially spherical pores have a deviation from the average spherical pore diameter which does not exceed about ± 50%.

3. The foamed ceramic element according to claim 1, wherein said crystalline phase is anorthite and the remaining solid portion X-ray amorphous.

4. The foamed ceramic element according to claim 1, having a density of about 200 to about 1,000 kg/m$^3$.

5. The foamed ceramic element according to claim 4, characterized by the fact that the compressive strength is between 2.5 and 12 N/mm$^2$.

6. The foamed ceramic element according to claim 4, characterized by the fact that it has pores of a diameter in the range of from about 1.5 to about 2.5 mm and has a density of from about 300 to about 600 kg/m$^3$.

7. The foamed ceramic element according to claim 1, characterized by the fact that it has a thermal conductivity of between about 0.08 to about 0.2 kcal/m h ° C.

8. Process for the production of a foamed ceramic element from mineral raw materials not ordinarily capable of being swelled comprising the steps of admixing said mineral raw material with a foaming adjuvant and water, said foaming adjuvant consisting essentially of sulfate and sulfide containing compounds, at least one of said sulfate or sulfide containing compounds being provided as a natural or industrial waste product, heating the mixture until foaming occurs, and subsequently cooling the foamed ceramic.

9. The foamed ceramic element according to claim 1, wherein the ratio of the mean diameter of the larger pores to the mean diameter of the smaller pores ranges from 4:1 to 5:1.

10. The foamed ceramic element according to claim 1, wherein said body portion includes a crystalline phase of 15 to 30 percent by weight.

11. A foamed ceramic element of lightweight construction made in accordance with the process of claim 8 characterized as having a crystalline phase of at least about 10 percent by weight, a water absorption characteristic nearly zero, a diffusion resistance factor which is practically infinite, a thermal conductivity of between about 0.08 to about 0.2 kcal/m h ° C.

* * * * *